US012007073B2

(12) United States Patent
Kim et al.

(10) Patent No.: US 12,007,073 B2
(45) Date of Patent: Jun. 11, 2024

(54) HEAT INSULATION STRUCTURE FOR CORNER PARTS OF LIQUEFIED NATURAL GAS STORAGE TANK

(71) Applicant: DAEWOO SHIPBUILDING & MARINE ENGINEERING CO., LTD., Geoje-Si (KR)

(72) Inventors: Tae Hoon Kim, Changwon-si (KR); Seong Woo Park, Geoje-si (KR); Seung Min Kwon, Incheon (KR); Kang Je Bang, Goyang-si (KR)

(73) Assignee: Hanwha Ocean Co., Ltd., Geoje-si (KR)

( * ) Notice: Subject to any disclaimer, the term of this patent is extended or adjusted under 35 U.S.C. 154(b) by 381 days.

(21) Appl. No.: 17/309,532

(22) PCT Filed: Dec. 19, 2019

(86) PCT No.: PCT/KR2019/018135
§ 371 (c)(1),
(2) Date: Jun. 3, 2021

(87) PCT Pub. No.: WO2020/138846
PCT Pub. Date: Jul. 2, 2020

(65) Prior Publication Data

US 2022/0026023 A1 Jan. 27, 2022

(30) Foreign Application Priority Data

Dec. 27, 2018 (KR) ........................ 10-2018-0170189

(51) Int. Cl.
*F17C 3/02* (2006.01)

(52) U.S. Cl.
CPC ...... *F17C 3/027* (2013.01); *F17C 2203/0354* (2013.01); *F17C 2203/0358* (2013.01);
(Continued)

(58) Field of Classification Search
CPC .............. F17C 3/027; F17C 2203/0354; F17C 2203/0358; F17C 2203/0631;
(Continued)

(56) References Cited

U.S. PATENT DOCUMENTS

2006/0117566 A1 6/2006 Yang et al.
2007/0028823 A1 2/2007 Yang et al.
(Continued)

FOREIGN PATENT DOCUMENTS

CN 1898124 A 1/2007
CN 104160201 A 11/2014
(Continued)

OTHER PUBLICATIONS

Japanese Office Action issued for Japanese Patent Application 2021-533278 dated Jun. 7, 2022.
(Continued)

*Primary Examiner* — Shawn M Braden
(74) *Attorney, Agent, or Firm* — Knobbe, Martens, Olson & Bear, LLP

(57) ABSTRACT

A heat insulation structure for corner parts of a liquefied natural gas (LNG) storage tank includes a secondary insulation wall arranged on an inner wall of a hull, a secondary sealing wall disposed on the secondary insulation wall, a primary insulation wall arranged on the secondary sealing wall, and a primary sealing wall disposed on the primary insulation wall. The heat insulation structure includes a corner assembly finishing an edge of the primary sealing wall at a corner part of the storage tank to complete sealing of the storage tank. The corner assembly includes an endcap sheet finishing each of four corners of the primary sealing wall provided to each surface of the storage tank to seal the four corners. The endcap sheet includes an endcap corrugation and an elongated corrugation extending in a direction
(Continued)

perpendicular to a direction in which the endcap corrugation extends.

9 Claims, 7 Drawing Sheets

(52) U.S. Cl.
CPC ................. *F17C 2203/0631* (2013.01); *F17C 2203/0643* (2013.01); *F17C 2203/0651* (2013.01); *F17C 2221/033* (2013.01); *F17C 2270/0107* (2013.01)

(58) Field of Classification Search
CPC ...... F17C 2203/0643; F17C 2203/0651; F17C 2221/033; F17C 2270/0107; F17C 13/004; F17C 2201/0157; F17C 2201/052; F17C 2203/0333; F17C 2223/0161; F17C 2260/011; F17C 2260/033; F17C 13/001; F17C 2203/0629; F17C 2209/221; F17C 2223/033; B63B 2221/02; B63B 25/16; B63B 2231/04; B63B 2231/34; B63B 2025/085
See application file for complete search history.

(56) References Cited

U.S. PATENT DOCUMENTS

| | | | | |
|---|---|---|---|---|
| 2014/0299038 | A1 | 10/2014 | Shin et al. | |
| 2018/0299068 | A1* | 10/2018 | Park | B65D 90/06 |
| 2021/0140585 | A1* | 5/2021 | Bang | B63B 25/16 |

FOREIGN PATENT DOCUMENTS

| | | | |
|---|---|---|---|
| CN | 106573663 | A | 4/2017 |
| CN | 107107995 | A | 8/2017 |
| CN | 108349577 | A | 7/2018 |
| JP | H05-157195 | A | 6/1993 |
| JP | 2007-525624 | A | 9/2007 |
| JP | 2012-171655 | A | 9/2012 |
| KR | 10-2001-0050440 | A | 6/2001 |
| KR | 10-2010-0083523 | A | 7/2010 |
| KR | 10-2010-0138165 | A | 12/2010 |
| KR | 10-2017-0022664 | A | 3/2017 |
| KR | 10-2017-0042873 | A | 4/2017 |
| KR | 10-2018-0046103 | A | 5/2018 |
| KR | 10-2018-0046297 | A | 5/2018 |
| KR | 10-2018-0084406 | A | 7/2018 |
| KR | 10-2018-0130039 | A | 12/2018 |
| WO | 2015/022473 | A2 | 2/2015 |
| WO | 2016/018038 | A1 | 2/2016 |
| WO | 2017/068303 | A1 | 4/2017 |

OTHER PUBLICATIONS

Extended European Search Report in EP Application No. 19904723.4 dated Sep. 19, 2022 in 8 pages.
Office Action in corresponding Chinese Application No. 201980086559.1 dated Feb. 13, 2023 and its English translation.
Written Opinion in corresponding SG Application No. 11202105727W dated Apr. 11, 2023.
Written Opinion in corresponding KR Application No. 10-2018-0170189 dated Apr. 18, 2023.
Search Report in corresponding SG Application No. 11202105727W dated Apr. 6, 2023.
International Search Report of PCT Application No. PCT/KR2019/018135—4 pages (dated Mar. 27, 2020).

* cited by examiner (a)

(b)

(a) (b)

HEAT INSULATION STRUCTURE FOR CORNER PARTS OF LIQUEFIED NATURAL GAS STORAGE TANK

TECHNICAL FIELD

The present invention relates to a heat insulation structure for corner parts of a liquefied natural gas storage tank, and more particularly to a connection structure at a corner part of a metal membrane for sealing a storage tank.

BACKGROUND ART

In general, natural gas is transported in a gaseous state through onshore or offshore gas pipelines, or transported in the form of liquefied natural gas (LNG) to a distant destination by an LNG carrier.

LNG is obtained by cooling natural gas to an extremely low temperature (about −163° C. or less) and has a volume of about 1/600 that of natural gas in a gaseous state. Thus, LNG is suitable for long-distance transportation by sea.

An LNG carrier, which is designed to carry LNG by sea to an onshore source of demand, or an LNG regasification vessel (LNG RV), which is designed to carry LNG by sea to an onshore source of demand, regasify the LNG, and discharge the regasified LNG to the onshore source of demand, is provided with an LNG storage tank (also referred to as a "cargo tank") that can withstand extremely low temperatures of LNG.

LNG storage tanks may be classified into an independent type and a membrane type depending upon whether a load of cargo is directly applied to an insulator of the storage tank.

The membrane type storage tank is classified into a GTT NO 96-type tank and a Mark III-type and the independent cargo tank is classified into an MOSS-type tank and an IHI-SPB-type tank.

The membrane type storage tank has a structure in which a secondary insulation wall, a secondary sealing wall, a primary insulation wall, and a primary sealing wall are sequentially stacked on an inner wall of a hull in the stated order.

The insulation walls serve to prevent intrusion of external heat into the cargo tank to prevent gasification of LNG and the sealing walls serve to prevent leakage of LNG from the storage tank. The storage tank has a dual heat insulation structure in order to allow the secondary sealing wall to prevent leakage of LNG for a predetermined period of time even upon damage to the primary sealing wall.

FIG. 1 is a side sectional view of a 135° corner part of a typical NO 96 type storage tank and FIG. 2 is a view of a membrane connection structure at the 135° corner part of the typical NO 96 type storage tank.

Referring to FIG. 1, the typical NO 96 type storage tank has a structure wherein a secondary sealing wall 120 and a primary sealing wall 140 each constituted of 0.5 mm to 0.7 mm thick Invar membranes are stacked on a secondary insulation wall 110 and a primary insulation wall 130 each constituted of insulation boxes.

The insulation box constituting each of the primary and secondary insulation walls 130, 110 is required to have high compressive strength and high rigidity in order to support a flat Invar membrane and may be manufactured in the form of a wooden box filled with perlite powder.

In the typical NO 96 type storage tank, the corner part (chamfer part) bent at an angle of 135° is provided with the sealing walls 120, 140 placed on inclined surfaces of an inner wall of the storage tank and a corner steel 150 connecting the sealing walls 120, 140 disposed on surfaces adjacent to the inclined surfaces.

As in the sealing walls 120, 140, the corner steel 150 is formed of Invar and is bent at an angle of 135° corresponding to an inclined surface of the corner part and extends in a longitudinal direction of the storage tank.

The sealing walls 140, 120 provided to the inclined surfaces of the inner wall of the storage tank and the surfaces adjacent thereto are connected to each other by the corner steel 150, thereby completing a sealing structure of the typical NO 96 type storage tank.

In the typical NO 96 type storage tank, the sealing walls 140, 120 formed of the same kind of material (Invar) as the corner steel 150 are welded to the corner steel 150 at the 135° corner part, and the sealing walls 140, 120 and the corner steel 150 do not require corrugations due to material characteristics thereof.

FIG. 3 is an inner perspective view of a 135° corner part of a typical MARK III type storage tank and FIG. 4 is a side sectional view of the 135° corner part of the typical MARK III type storage tank. FIG. 5 is a view of a corner piece and an angle piece provided to the corner part of the typical MARK III type storage tank, in which (a) shows a corner piece and an angle piece for the 135° corner part of the storage tank and (b) shows a corner piece and an angle piece for a 90° corner part of the storage tank.

Referring to FIG. 3 and FIG. 4, the typical MARK III type storage tank has a structure wherein a primary sealing wall 240 constituted of 1.2 mm thick stainless steel (SUS) membranes, a secondary sealing wall (not shown) having a triplex structure, and primary and secondary insulation walls 230, 210 each formed of polyurethane foam are alternately stacked on an inner wall of a hull H.

The primary sealing wall 240 is formed with multiple corrugations facing the interior of the storage tank in order to allow deformation of the membrane corresponding to thermal contraction caused by cryogenic LNG stored in the storage tank.

The primary sealing wall 240 having the corrugations is manufactured in a suitable size to be inserted into the storage tank and is welded to other primary sealing walls over the entire region of the storage tank such that the corrugations formed on adjacent primary sealing walls 140 coupled to each other are connected to each other.

The storage tank is formed with chamfers beveled at a certain angle at upper and lower portions of a side surface of the storage tank in order to reduce sloshing of a cargo (LNG) stored in the storage tank and each of the chamfers is provided with corner members 250, which connect a primary sealing wall 240 disposed on a beveled surface of each of the chamfers to a primary sealing wall 240 disposed on a horizontal surface (bottom surface/ceiling surface) or side surface of the storage tank, thereby completing the sealing structure of the storage tank.

The corner members 250 include a corner piece 251, which connects the primary sealing walls 240 disposed on adjacent surfaces in the storage tank, an angle piece 252, which connects curved portions of the corrugations formed on the primary sealing walls 240 connected to opposite ends of the corner piece 251 to seal the corrugations, and a wooden block 253 placed corresponding to the height of the primary insulation wall 230 to support the corner piece 251.

The corner piece 251 is provided in the form of a bent metal sheet extending along an edge of the corner part. The corner piece 251 may be realized by a metal sheet bent at an angle, for example, 135°, defined between the beveled surface of the chamfer and the horizontal surface (bottom surface/ceiling surface) or side surface of the storage tank.

The corner piece 251 is mechanically fastened to the wooden block 253 by a rivet or a screw to be secured to the corner part.

The corner piece 251 is welded at the opposite ends thereof to the primary sealing wall 240 disposed on the beveled surface of the chamfer and the primary sealing wall 240 disposed on the horizontal surface (bottom surface/ceiling surface) or side surface of the storage tank by lap welding, respectively.

Here, the angle piece 252 serves to seal the corrugations, which are formed on the primary sealing walls 240 connected to the opposite ends of the corner piece 251 and are in an open state. The angle piece 252 has corrugations finished in an open state corresponding to the corrugations formed on the primary sealing walls 240 in order to connect curved portions of the corrugations at both sides.

Since the corrugations on the typical angle piece 252 are formed by bending a single corrugation at 135°, the typical angle piece is vulnerable to fatigue load due to significant concentration of stress on a sharply bent portion of the angle piece 252 at which the corrugations meet.

Moreover, the geometrical shape of the bent portion at which the corrugations meet makes it difficult to manufacture the typical angle piece 252 and to adopt automatic welding at a work site.

Moreover, in the typical MARK III type storage tank including the corner members 250, the corrugations of the sealing walls formed on adjacent surfaces in the storage tank are connected to each other by the angle piece 252, whereby more strict tolerance management is required to match the corrugations at both sides, thereby causing deterioration in productivity in all processes including welding operation, despite an advantage of continuous flexibility.

As shown in FIG. 3 and FIG. 4, in the typical MARK III type storage tank, the corner member 250 is applied not only to the corner part in which the side surface of the storage tank is inclined at an angle of 135° with respect to the bottom (ceiling) surface thereof, but also to the corner part in which a front wall or rear wall of the storage tank is inclined at an angle of 90° with respect to the bottom (ceiling) surface thereof.

In FIG. 5, (a) and (b) shows corner pieces 251; 251' and angle pieces 252; 252' provided to the 135° corner part and the 90° corner part of the storage tank, respectively. For the typical corner members 250 applied to the 90° corner part of the storage tank, the corner piece 251 and the angle piece 252 are provided in a 90° bent shape.

DISCLOSURE

Technical Problem

It is an aspect of the present invention to provide a panel type insulation system having an improved structure, in which an insulation wall is constituted of insulation panels formed of polyurethane foam and a secondary sealing wall is constituted of flat Invar membranes, and a membrane connection structure of a corner part of an LNG storage tank suitably designed for the insulation system.

Technical Solution

In accordance with one aspect of the present invention, there is provided a heat insulation structure for corner parts of an LNG storage tank, the LNG storage tank including a secondary insulation wall constituted of multiple secondary insulation panels arranged on an inner wall of a hull, a secondary sealing wall disposed on the secondary insulation wall, a primary insulation wall constituted of multiple primary insulation panels arranged on the secondary sealing wall, and a primary sealing wall disposed on the primary insulation wall, the heat insulation structure including a corner assembly finishing an edge of the primary sealing wall at a corner part of the storage tank to complete sealing of the storage tank, wherein the corner assembly includes an endcap sheet finishing each of four corners of the primary sealing wall provided to each surface of the storage tank to seal the four corners, the endcap sheet being formed with: an endcap corrugation having an endcap shape and finishing a corrugation formed on the primary sealing wall; and an elongated corrugation extending in a direction perpendicular to a direction in which the endcap corrugation extends.

The elongated corrugation may extend while maintaining a constant height on the endcap sheet so as to have an open structure at opposite ends of the endcap sheet in a width direction thereof, and the endcap sheet may be provided in plural to be continuously arranged in longitudinal and transverse directions of the storage tank such that the elongated corrugations formed on the endcap sheets are continuously connected to each other and extend in the longitudinal and transverse directions of the storage tank.

The corner assembly may further include a corner finishing sheet finishing and sealing each of the four corners of the primary sealing wall provided to each surface of the storage tank, the corner finishing sheet being formed with a corner finishing corrugation finishing the elongated corrugation formed on the endcap sheet.

The primary sealing walls disposed on adjacent surfaces in the storage tank may be independently finished.

The heat insulation structure may further include: a transverse connector extending along an edge of each of front and rear walls of the storage tank in the transverse direction and supporting the primary and secondary sealing walls; and an Invar beam extending along an edge of a chamfer surface in the storage tank in the longitudinal direction and supporting the primary sealing wall, wherein the endcap sheet is welded at one end thereof to the transverse connector or the Invar beam and at the other end thereof to the primary sealing wall by lap welding.

The primary sealing wall may be constituted of a stainless steel (SUS) membrane, and the endcap sheet and the corner finishing sheet may be formed of an Invar material.

The transverse connector and the Invar beam may be formed of an Invar material and may be supported on the inner wall of the hull by an insulation box constituted of a plywood box.

In accordance with another aspect of the present invention, there is provided a heat insulation structure for corner parts of an LNG storage tank, the LNG storage tank including a secondary insulation wall constituted of multiple secondary insulation panels arranged on an inner wall of a hull, a secondary sealing wall disposed on the secondary insulation wall, a primary insulation wall constituted of multiple primary insulation panels arranged on the secondary sealing wall, and a primary sealing wall disposed on the primary insulation wall, the heat insulation structure including: endcap sheets each including an endcap corrugation formed on a flat metal sheet and sealing a corrugation formed on the primary sealing wall such that the storage tank can be sealed without bending the corrugation at a corner part of the storage tank, as members for sealing each of four corners of the primary sealing wall, wherein each of the endcap sheets is formed with an elongated corrugation extending in a direction perpendicular to the endcap corrugation such that the elongated corrugations formed on the endcap sheets are continuously connected to each other and extend in longitudinal and transverse directions of the storage tank, as the endcap sheets are continuously arranged in the longitudinal and transverse directions of the storage tank.

The primary sealing wall disposed on each surface of the storage tank may be independently finished.

The heat insulation structure may further include a corner finishing sheet finishing an endcap sheet disposed at a distal end of the storage tank among the endcap sheets continuously arranged in the longitudinal and transverse directions of the storage tank, the corner finishing sheet being formed with a corner finishing corrugation finishing the elongated corrugation formed on the endcap sheet.

Advantageous Effects

An LNG storage tank according to the present invention adopts a panel type insulation system having an improved structure, in which insulation walls are constituted of insulation panels each formed of polyurethane foam and a secondary sealing wall is constituted of flat Invar membranes.

With this structure, the present invention can secure improvement in productivity through automation of welding for installation of the secondary sealing wall on a secondary insulation wall, and good heat insulation through construction of a primary insulation wall and the secondary insulation wall using insulation panels formed of polyurethane foam.

Further, in the panel type insulation system according to the present invention, an insulation wall at a corner part of the storage tank has a combined structure of an insulation box and an insulation panel, thereby providing a countermeasure against a height difference of the insulation wall at the corner part of the storage tank upon thermal contraction due to an extremely low temperature.

The present invention provides a corner assembly including elongated corrugations extending in longitudinal and transverse directions of the storage tank, thereby preventing problems caused by the height difference of the insulation wall.

According to the present invention, a distal end of the primary sealing wall can be easily sealed by an endcap sheet including multiple corrugations, thereby improving productivity through reduction in tolerance burden. The present invention does not require mass production of angle pieces for connection between corrugations formed on a typical primary sealing wall and can reduce the welding amount by 4 times or more.

Further, according to the present invention, the endcap sheet is constituted of Invar membranes, thereby relieving concentration of thermal stress on the corner part of the storage tank while providing an advantage in terms of fatigue lifespan, as compared with a typical angle piece including corrugations having a bent shape.

Furthermore, according to the present invention, the endcap sheet and the corner finishing sheet constituting the corner assembly for finishing the primary sealing wall in the storage tank have flat edges, thereby increasing applicability of automation of welding through easy size adjustment and cutting at the port/starboard sides.

BEST MODE

Figure 1:
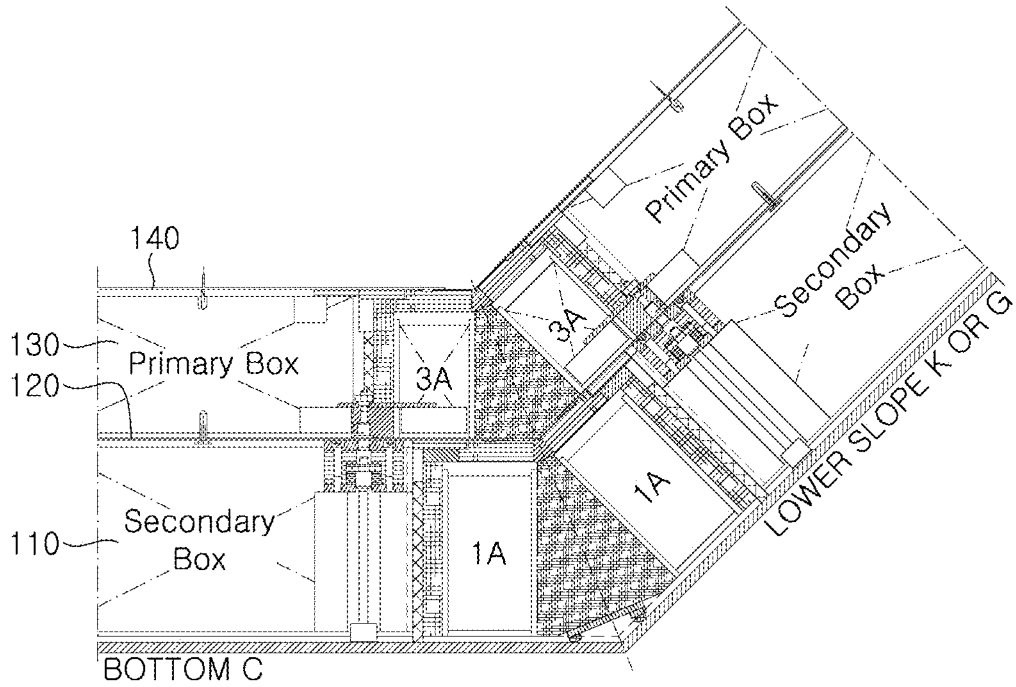
FIG. 1 is a side sectional view of a 135° corner part of a typical NO 96 type storage tank.
Figure 2:
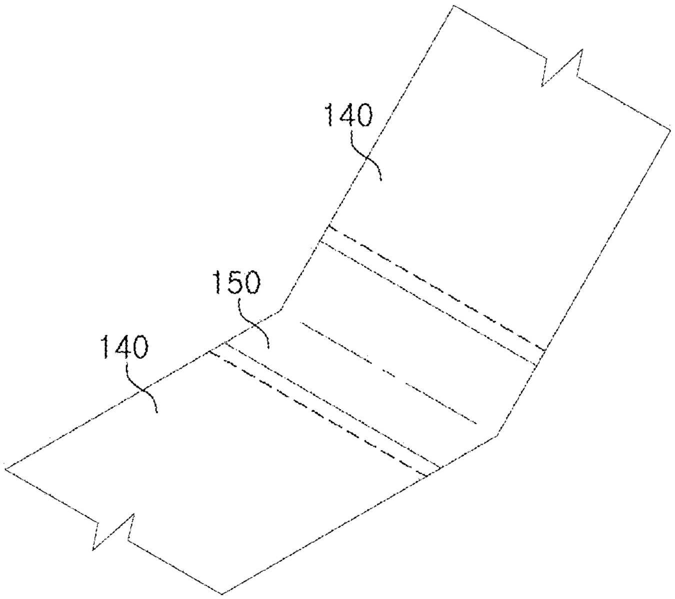
FIG. 2 is a view of a membrane connection structure at the 135° corner part of the typical NO 96 type storage tank.

The above and other aspects, features, and advantages of the present invention will become apparent from the detailed description of the following embodiments in conjunction with the accompanying drawings.

Hereinafter, embodiments of the present invention will be described in detail with reference to the accompanying drawings. Like components will be denoted by like reference numerals throughout the specification.

Herein, the terms “primary” and “secondary” are used to distinguish components providing primary sealing or insulation to a storage tank from components providing secondary sealing or insulation to the storage tank.

In addition, as used herein to describe components of a tank, the term “upper” or “above” refers to an inward direction of the tank, regardless of the direction of gravity, and the term “lower” or “below” refers to an outward direction of the tank, regardless of the direction of gravity.

Figure 6:
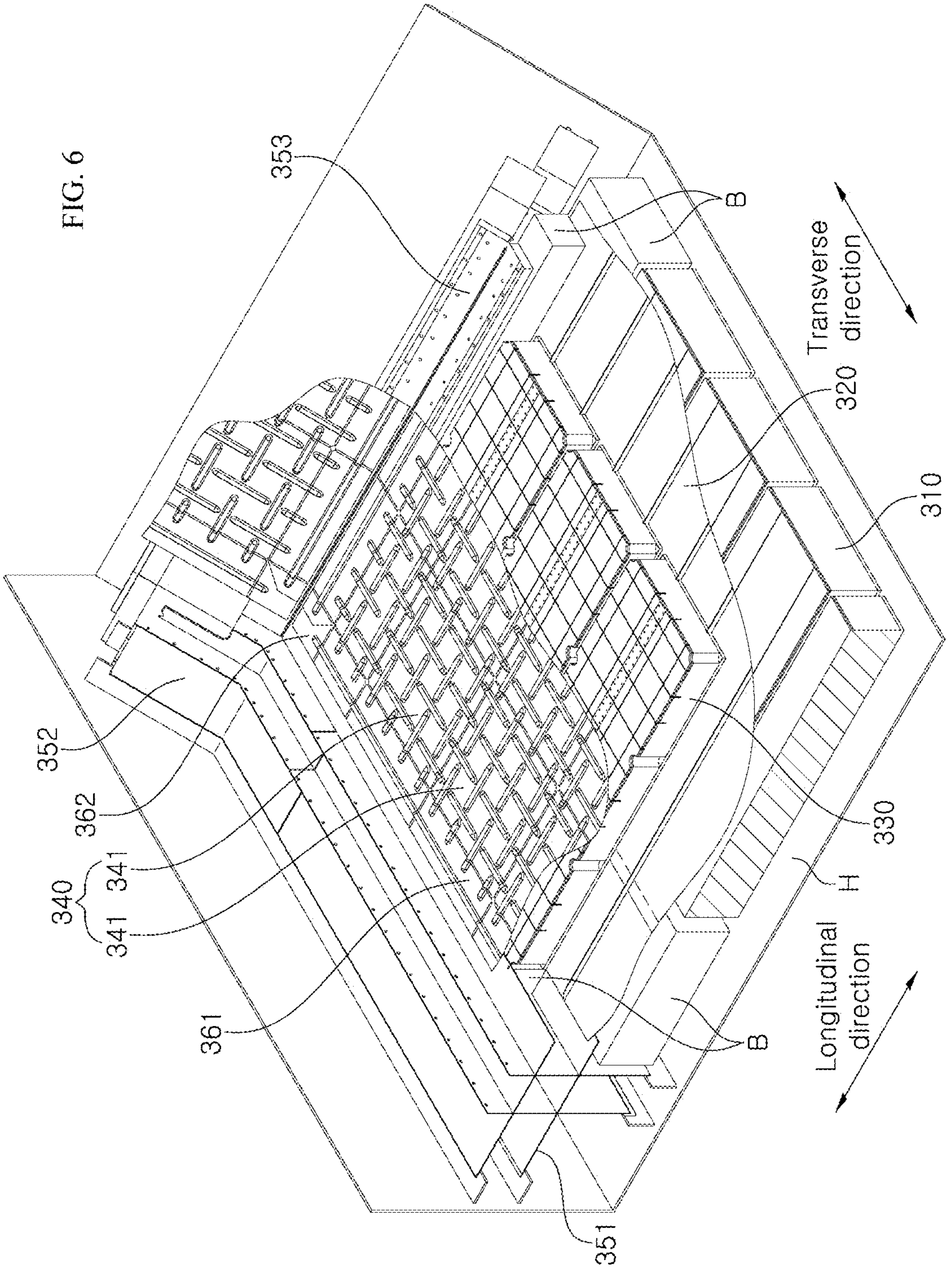
FIG. 6 is an inner perspective view of a heat insulation structure of an LNG storage tank according to the present invention.

FIG. 6 is an inner perspective view of a heat insulation structure of an LNG storage tank according to the present invention.

Referring to FIG. 6, the LNG storage tank according to the present invention includes: a secondary insulation wall 310 constituted of multiple secondary insulation panels arranged on an inner wall of a hull H, a secondary sealing wall 320 disposed on the secondary insulation wall 310, a primary insulation wall 330 constituted of multiple primary insulation panels arranged on the secondary sealing wall 320, and a primary sealing wall 340 disposed on the primary insulation wall 330.

The multiple secondary insulation panels constituting the secondary insulation wall 310 are provided in the form of unit panels each having a hexahedral shape and are arranged on the inner wall of the hull H in longitudinal and transverse direction of the storage tank to constitute the secondary insulation wall 310.

Likewise, the multiple primary insulation panels constituting the primary insulation wall 330 are provided in the form of unit panels each having a hexahedral shape and are arranged on the secondary sealing wall 320 in the longitudinal and transverse directions of the storage tank to constitute the primary insulation wall 330.

The primary and secondary insulation panels may be realized in the form of sandwich panels each having a plywood sheet bonded to an upper or lower surface of polyurethane foam (PUF) or to both upper and lower surfaces thereof and may be manufactured as unit panels having a width-to-length ratio of about 1:3 and the same size.

The primary and secondary insulation panels constituting the primary and secondary insulation walls 330, 310 are preferably formed of rigid polyurethane foam (RPUF), which has higher rigidity than typical polyurethane foam, in order to constitute the secondary sealing wall 320, which will be described below, using flat Invar membranes.

The secondary insulation wall 310 may be secured to the inner wall of the hull H by a stud or a bonding agent, such as an epoxy mastic resin and the like, and the primary insulation wall 330 may be secured to an upper surface of the secondary sealing wall 320 so as to contact the upper surface thereof by coupling the primary insulation panel to securing devices disposed on an upper surface of the secondary insulation panel, with the secondary sealing wall 320 interposed between the primary insulation wall 330 and the secondary insulation wall 310.

The secondary sealing wall 320 may be constituted of flat Invar membranes.

The secondary sealing wall 320 may be secured to an upper surface of the secondary insulation wall 310 so as to contact the upper surface thereof by welding multiple Invar strakes to tongue members disposed on the upper surface of the secondary insulation panel without generating a gap therebetween. The Invar strakes are metal plates having a band shape with a narrow width.

In the LNG storage tank according to the present invention, each of the primary and secondary insulation walls 330, 310 is provided in the form of an insulation panel having a wooden plywood sheet bonded to upper and/or lower surfaces of polyurethane foam and the secondary sealing wall 320 is constituted of the flat Invar membranes.

Typically, the flat Invar membrane has a small coefficient of thermal contraction and is not suitable for a panel type insulation system in which insulation panels are formed of polyurethane foam.

For application of the flat Invar membranes, it is necessary to constitute the insulation wall supporting the membranes using insulation boxes that exhibit less deformation upon thermal contraction and have high rigidity, as in the typical NO 96 type storage tank.

However, according to the present invention, the heat insulation structure has a structure for reinforcing rigidity of the secondary insulation wall 310, thereby providing the secondary insulation wall 310 constituted of the insulation panels each formed of the polyurethane foam while enabling construction of the secondary sealing wall 320 using the flat Invar membranes.

Specifically, the storage tank according to the present invention further includes a transverse connector 351 provided to the corner part of the storage tank and supporting opposite ends of the secondary sealing wall 320.

The transverse connector 351 is a lattice-shaped structure disposed along an edge of each of front and rear walls of the storage tank and serves to support the opposite ends of each of the primary and secondary sealing walls 340, 320 such that load applied to the primary and secondary sealing walls 340, 320 can be transferred to the hull H therethrough.

The transverse connector 351 is formed of Invar having high rigidity and is secured to the corner part of the storage tank by welding the transverse connector 351 to an anchoring bar formed on the inner wall of the hull. Both distal ends of each of the primary and secondary sealing walls 340, 320 are secured to and supported by the transverse connector 351 through welding, whereby load applied to the primary and secondary sealing walls 340, 320 can be transferred to the hull H through the transverse connector.

An insulation box B (some not shown) having high rigidity may be disposed in the transverse connector 351 and between the transverse connector 351 and the hull H to support the transverse connector 351. The insulation box B may be prepared by filling a plywood box with perlite powder.

As such, according to the present invention, load applied to the primary and secondary sealing walls 340, 320 can be partially reduced by the transverse connector 351 disposed at the corner part of the storage tank, thereby making it possible to form the secondary insulation wall 310, which supports the secondary sealing wall 320 constituted of the flat Invar membranes, using insulation panels having lower rigidity than the insulation box.

Accordingly, the present invention enables formation of a straight welding line upon installation of the secondary sealing wall 320 on the secondary insulation wall 310, thereby improving productivity through automation of welding.

Further, according to the present invention, each of the primary and secondary insulation walls 330, 310 is constituted of insulation panels formed of the polyurethane foam, thereby securing good heat insulation. In the LNG storage tank according to the present invention, the thickness of the primary insulation wall can be reduced by about 40% or more and the thickness of the secondary insulation wall can be reduced by about 20% or more while maintaining the same insulation effect, as compared with the typical NO 96 type storage tank in which the insulation wall is provided in the form of the insulation box.

The primary sealing wall 340 serves to seal LNG while directly contacting LNG and is preferably constituted of stainless steel (SUS) membranes having a higher coefficient of thermal contraction than Invar. The primary sealing wall 340 may be formed with multiple wave-shaped corrugations facing the interior of the storage tank to absorb contraction due to an extremely low temperature of LNG.

The primary sealing wall 340 may be disposed on the primary insulation wall 330 to closely contact an upper surface thereof by welding multiple unit membranes 341 formed of stainless steel (SUS) to anchor strips disposed on the upper surface of the primary insulation panel without generating a gap therebetween.

As described above, the transverse connector 351 is provided to the corner part formed at an angle of 90° along the edge of each of the front and rear walls of the storage tank and extends in the transverse direction of the storage tank to support the opposite ends of each of the primary and secondary sealing walls 340, 320.

A trihedron 352 is provided to a corner part of the storage tank, at which a chamfer surface of the storage tank meets a horizontal surface and a vertical surface, and connects two transverse connectors 351 to each other.

An Invar beam 353 extending in the longitudinal direction of the storage tank is provided to a corner part (chamfer part) formed at an angle of 135° between the chamfer surface of the storage tank and a horizontal surface (bottom/ceiling surface) or a side surface of the storage tank. The Invar beam 353 is a member connecting a trihedron 352 provided to a front wall side of the storage tank and a trihedron (not shown) provided to the rear wall side thereof.

The trihedron 352 and the Invar beam 353 may be provided in the form of a being shape bent at an angle of 135° so as to correspond to inclination of the chamfer. Both the trihedron 352 and the Invar beam 353 may be formed of Invar having a low coefficient of thermal contraction and high rigidity and may be supported on the inner wall of the hull H by the insulation box B. The insulation box B may be provided in the form of a plywood box filled with perlite powder to have high compressive strength and rigidity.

In summary, the LNG storage tank according to the present invention has a structure wherein insulation boxes B having high rigidity are disposed along edges of each surface constituting the storage tank to support the members (the transverse structure, the trihedron, or the Invar beam) disposed along each corner part of the storage tank and insulation panels formed of the polyurethane foam are disposed inside the insulation boxes B.

Next, referring to FIG. 6, it can be seen that, among the multiple unit membranes 341 constituting the primary sealing wall 340, a unit membrane 341 disposed at the outermost side in the longitudinal direction of the storage tank is connected to the transverse structure 351 and a unit membrane 341 disposed at the outermost side in the transverse direction thereof is connected to the Invar beam 353.

The unit membrane 341 has a structure wherein multiple corrugations are formed on a stainless (SUS) membrane sheet generally having a rectangular shape in the longitudinal and transverse directions of the storage tank. The corrugations are continuously arranged at constant intervals in the longitudinal and transverse directions of the storage tank.

The LNG storage tank according to the present invention includes a corner assembly 360, which connects the unit membrane 341 disposed on the primary sealing wall 340 to the transverse connector 351 or an Invar beam 353 at the corner part of the storage tank to complete sealing of the storage tank.

Figure 7:
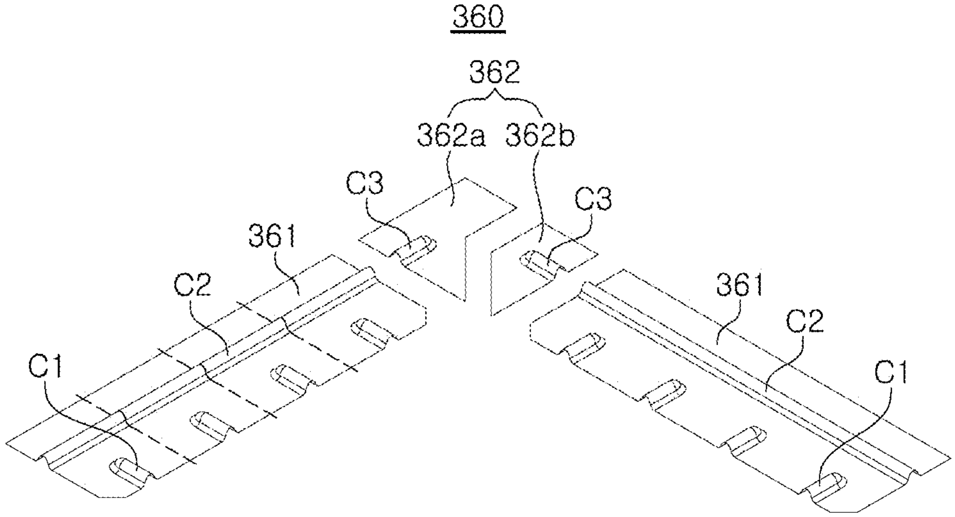
FIG. 7 is a view of a corner assembly provided to a corner part of the LNG storage tank according to the present invention.

Next, referring to FIG. 6 and FIG. 7, the heat insulation structure for corner parts of the LNG storage tank according to the present invention will be described. FIG. 7 is a view of the corner assembly provided to a corner part of the LNG storage tank according to the present invention.

Referring to FIG. 6 and FIG. 7, according to the present invention, the corner assembly 360 includes an endcap sheet 361, which finishes a unit membrane 410 disposed on the primary sealing wall 340 at the corner part of the storage tank.

The endcap sheet 361 connect the unit membrane 341 disposed at the outermost side of the primary sealing wall 340 to the transverse structure 351 or the Invar beam 353 in the storage tank, and is connected at one end thereof to the transverse structure 351 or the Invar beam 353 and at the other end thereof to the unit membrane 341 by lap welding.

The endcap sheet 361 may be provided in the form of a flat metal sheet having multiple endcap corrugations c1 formed thereon.

The endcap corrugations c1 may be provided in an endcap shape. That is, one side of the endcap corrugation c1 may be finished inside the endcap sheet 361 and the other side of the endcap corrugation c1 may extend to the other end of the endcap sheet 361 and may be finished in an open state so as to maintain a corrugated shape.

The endcap corrugations c1 on each endcap sheet 361 may be formed corresponding to corrugations of the unit membrane 341 to be connected thereto such that the endcap sheets 361 can be welded to the unit membranes 341 with the corresponding corrugations engaged with each other.

Accordingly, the endcap corrugations c1 may be formed at constant intervals on the endcap sheet 361 so as to correspond to the corrugations formed at constant intervals on the unit membrane 341.

As shown in FIG. 6, since the endcap sheets 361 may be connected to the unit membranes 341 adjacent thereto in the longitudinal direction of the unit membranes 341 or in the transverse direction of the unit membrane 341, it is desirable that a transverse distance between the corrugations formed on the unit membrane 341 be the same as a longitudinal distance therebetween.

Preferably, the endcap sheets 361 are formed of Invar having a low coefficient of thermal expansion. Since Invar has 7 times lower physical properties than stainless steel (SUS), Invar can suppress thermal deformation and heat concentration.

In addition, even in consideration of welding to the primary sealing wall 340 formed of stainless steel (SUS), welding between stainless steel (SUS) and Invar is thermally preferred to welding between stainless steels (SUS).

The endcap sheet 361 may further include an elongated corrugation c2 extending in a width direction thereof. The elongated corrugation c2 is formed in a direction perpendicular to the extension direction of the endcap corrugation c1 and extends on the endcap sheet 361 while maintaining a constant height.

Accordingly, the elongated corrugation c2 has an open structure at opposite ends of the endcap sheet 361 in the width direction thereof and adjacent endcap sheets 361 may be connected to each other by lap welding, with the elongated corrugations c2 engaged with each other.

According to the present invention, the corner assembly 360 further includes a corner finishing sheet 362, which finishes the endcap sheet 361 disposed at a distal end of the storage tank among the endcap sheets 361 arranged in the longitudinal and transverse directions of the storage tank.

The corner finishing sheet 362 serves to seal an apex in the overall structure of the primary sealing wall 340 and includes corner finishing corrugations c3, which are formed corresponding to the elongated corrugations c2 extending in the longitudinal and transverse directions of the storage tank to finish the elongated corrugations c2, as the multiple endcap sheets 361 are continuously arranged in the longitudinal and transverse directions of the storage tank.

The corner finishing sheet 362 may include a first corner finishing sheet 362*a* adapted to finish the elongated corrugation c2 extending in the transverse direction of the storage tank and a second corner finishing sheet 362*b* adapted to finish the elongated corrugation c2 extending in the longitudinal direction of the storage tank.

The first corner finishing sheet 362*a* and the second corner finishing sheet 362*b* may be provided as separate components, as shown in the drawings, or may be provided as an integrated component.

Although the endcap sheet 361 is illustrated as including multiple endcap corrugations c1 in this embodiment, it should be understood that the present invention is not limited thereto. Alternatively, the endcap sheet 361 may be cut along a line indicated by a dotted line in FIG. 7 such that one endcap sheet 361 includes a single endcap corrugation c1.

Next, the following description will be given of effects by the elongated corrugations c2 extending in the longitudinal and transverse directions of the storage tank in the corner assembly 360 disposed at the corner part of the LNG storage tank according to the present invention.

Figure 8:
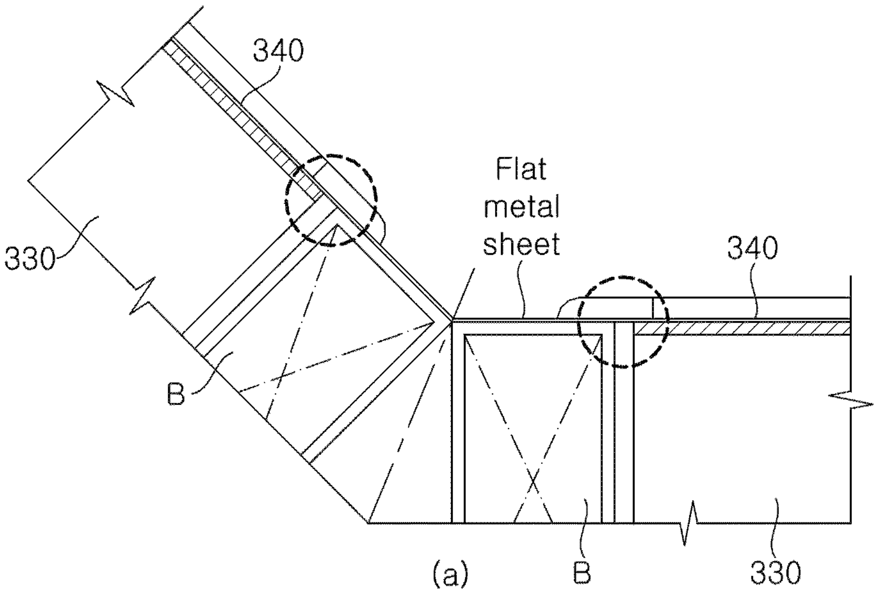
FIG. 8 shows (a) a flat metal sheet as a membrane connection member provided to a 135° corner part of the LNG storage tank according to the present invention and (b) a view for illustrating problems caused by this structure.
Figure 8:
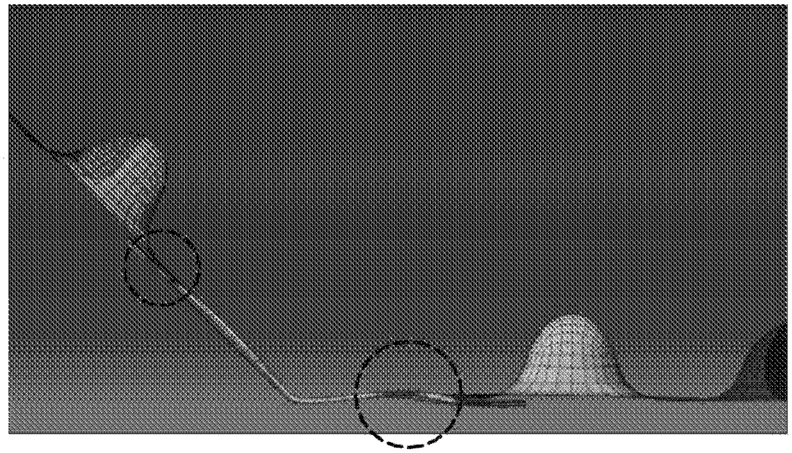

FIG. 8 shows a flat metal sheet as a membrane connection member provided to the 135° corner part of the LNG storage tank according to the present invention.

As described above, the LNG storage tank according to the present invention has a structure in which insulation boxes B are disposed at corners of each surface constituting the storage tank and the insulation panels 330 formed of polyurethane foam are interposed between the insulation boxes B and the surface of the storage tank. That is, the insulation box B and the insulation panel 330 are disposed adjacent to each other at the corner part of the LNG storage tank according to the present invention.

In this structure, a height difference occurs between the insulation box B and the insulation panel 330 at cryogenic temperature due to difference in thermal contraction between the insulation box B and the insulation panel 330.

Here, in the structure wherein the primary sealing walls 340 disposed on adjacent surfaces at the corner part of the storage tank are connected to each other through a flat metal sheet, stress is concentrated on the height difference between the insulation box B and the insulation panel 330, thereby generating force lifting the metal sheet, as shown in FIG. 8(*b*). The force can cause severe deformation or displacement of the metal sheet, and in severe cases, can lead to deterioration in air-tightness of the storage tank or damage to the storage tank.

The LNG storage tank according to the present invention allows finishing of the primary sealing wall 340 disposed on the chamfer surface of the storage tank and finishing of the primary sealing walls 340 disposed on surfaces adjacent to the chamfer surface to be independently achieved, and includes the elongated corrugations c2 on the endcap sheets 361 finishing the primary sealing walls 340 to overcome the problems caused by the height difference between the insulation box B and the insulation panel 330 at the corner part of the storage tank.

Further, according to the present invention, the elongated corrugations c2 are formed on the endcap sheets 361 to absorb thermal contraction in a direction perpendicular to a thermal contraction direction absorbed by the endcap corrugations c1, thereby further relieving concentration of heat stress on the corner part of the storage tank.

Figure 9:
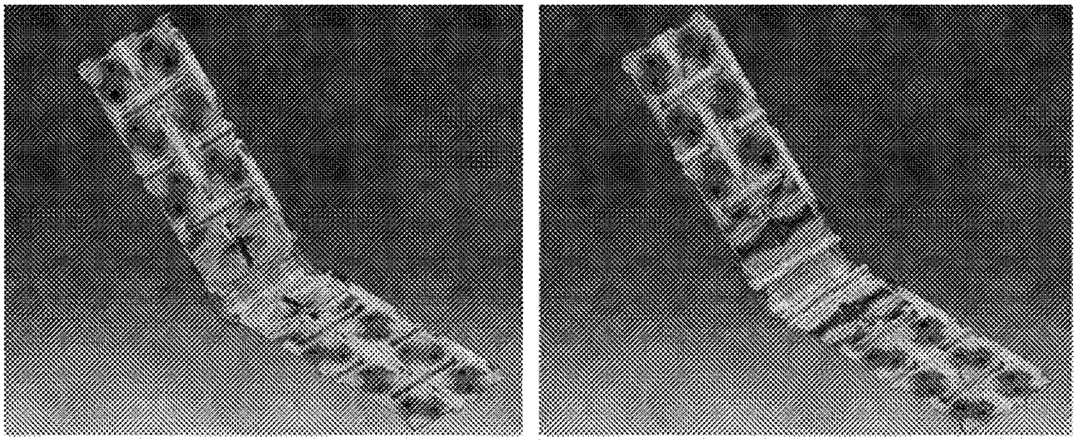
FIG. 9 shows results of simulation analysis on stress concentrated on the corner part of the LNG storage tank according to the present invention, in which (a) shows a result of simulation analysis in application of the flat metal sheet shown in FIG. 8 and (b) shows a result of simulation analysis in application of a corner assembly including an elongated corrugation according to the present invention.

FIG. 9 shows results of simulation analysis on stress concentrated on the corner part of the LNG storage tank according to the present invention, in which (a) shows a result of simulation analysis in application of the flat metal sheet shown in FIG. 8 and (b) shows a result of simulation analysis in application of the corner assembly 360 including the elongated corrugation.

Comparing analysis results of FIGS. 9 (*a*) and (*b*), it can be seen that FIG. 9(*b*) shows remarkable relieving of thermal stress concentrated on the corner part of the storage tank, as compared with FIG. 9(*a*).

In the typical NO 96 type storage tank shown in FIG. 1, since the sealing walls do not include corrugations and all of the insulation walls have a wooden box structure having the same rigidity, the height difference does not substantially occur as in the present invention.

Figure 3:
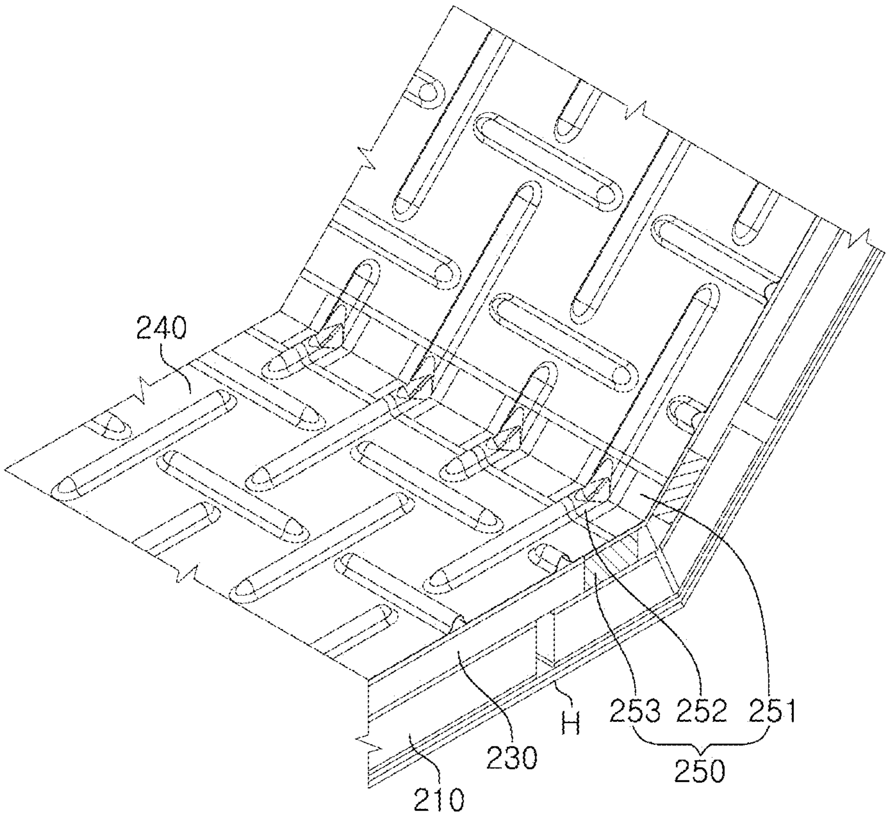
FIG. 3 is an inner perspective view of a 135° corner part of a typical MARK III type storage tank.
Figure 4:
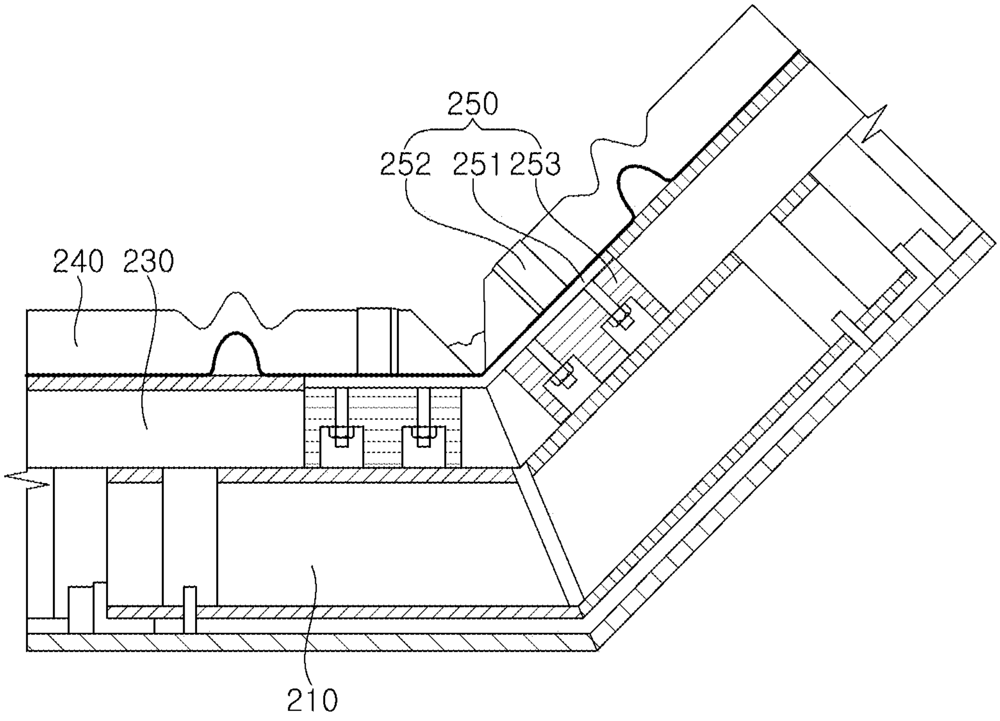
FIG. 4 is a side sectional view of the 135° corner part of the typical MARK III type storage tank.
Figure 5:
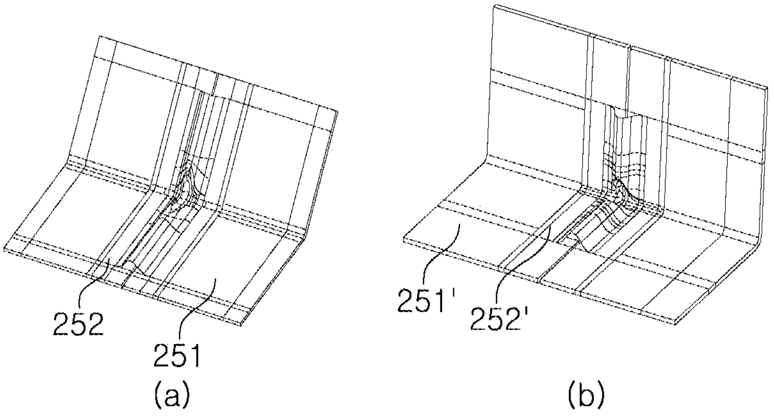
FIG. 5 is a view of a corner piece and an angle piece provided to the corner part of the typical MARK III type storage tank, in which (a) shows a corner piece and an angle piece for the 135° corner part of the storage tank and (b) shows a corner piece and an angle piece for a 90° corner part of the storage tank.

Further, in the typical MARK III type storage tank shown in FIG. 3 and FIG. 4, since the corner insulation walls of the storage tank are formed of the same polyurethane foam (PUF) excluding the wooden block 253, the height difference does not substantially occur as in the present invention.

However, in the LNG storage tank according to the present invention, since the corner part is provided with the insulation box B and the insulation panels 330, 130 as described above, it is necessary to overcome the problems caused by the height difference therebetween. Thus, the storage tank according to the present invention includes the corner assembly 360 that includes the elongated corrugations c2 extending in the longitudinal and transverse directions of the storage tank, thereby preventing occurrence of the problems caused by the height difference.

According to the present invention, the corner assembly 360 may be realized by a flat membrane plate having corrugations formed thereon to allow cutting at the port/starboard sides, thereby reducing tolerance burden while improving application efficiency at work sites.

That is, the endcap sheets 361 and the corner finishing sheets 362 generally have flat edges to allow easy size adjustment, thereby enabling application through direct cutting according to installation tolerance at work sites.

Furthermore, the typical MARK III type storage tank requires mass production of different types of angle pieces for application to the 90° corner part and the 135° corner part, whereas the LNG storage tank according to the present invention allows the membranes disposed at the 90° and 135° corner parts to be finished by the same endcap sheet and thus can reduce the welding amount by four times or more, thereby achieving remarkable improvement in productivity in manufacture of the storage tank.

It will be apparent to those skilled in the art that the present invention is not limited to the embodiments described above and that various modifications, changes, alterations, and equivalent embodiments can be made without departing from the spirit and scope of the present invention. Therefore, such modifications, changes, alterations, and equivalent embodiments fall within the spirit and scope of the claims.

The invention claimed is:

1. A heat insulation structure for corner parts of an LNG storage tank, the LNG storage tank including a secondary insulation wall comprising multiple secondary insulation panels arranged on an inner wall of a hull, a secondary sealing wall disposed on the secondary insulation wall, a primary insulation wall comprising multiple primary insulation panels arranged on the secondary sealing wall, and a primary sealing wall disposed on the primary insulation wall, the heat insulation structure comprising:

a corner assembly finishing an edge of the primary sealing wall at a corner part of the storage tank to complete sealing of the storage tank, wherein the corner assembly comprises an endcap sheet finishing each of four corners of the primary sealing wall provided to each surface of the storage tank to seal the four corners, wherein the endcap sheet comprises an endcap corrugation having an endcap shape and finishing a corrugation formed on the primary sealing wall; and an elongated corrugation extending in a direction perpendicular to a direction in which the endcap corrugation extends, wherein the elongated corrugation extends while maintaining a constant height on the endcap sheet so as to have an open structure at opposite ends of the endcap sheet in a width direction thereof, and wherein the endcap sheet is provided in plural to be continuously arranged in longitudinal and transverse directions of the storage tank such that the elongated corrugations formed on the endcap sheets are continuously connected to each other and extend in the longitudinal and transverse directions of the storage tank.

2. The heat insulation structure according to claim 1, where in the corner assembly further comprises:

a corner finishing sheet finishing and sealing each of the four corners of the primary sealing wall provided to each surface of the storage tank, and the corner finishing sheet comprising a corner finishing corrugation finishing the elongated corrugation formed on the endcap sheet.

3. The heat insulation structure according to claim 2, wherein the primary sealing walls disposed on adjacent surfaces in the storage tank respectively comprise edges that are apart from each other.

4. The heat insulation structure according to claim 3, further comprising:

a transverse connector extending along an edge of each of front and rear walls of the storage tank in the transverse direction and supporting the primary and secondary sealing walls; and an Invar beam extending along an edge of a chamfer surface in the storage tank in the longitudinal direction and supporting the primary sealing wall, wherein the endcap sheet is welded at one end thereof to the transverse connector or the Invar beam and at the other end thereof to the primary sealing wall by lap welding.

5. The heat insulation structure according to claim 4, wherein the primary sealing wall is constituted of a stainless steel (SUS) membrane, and the endcap sheet and the corner finishing sheet are formed of an Invar material.

6. The heat insulation structure according to claim 5, wherein the transverse connector and the Invar beam are formed of an Invar material and are supported on the inner wall of the hull by an insulation box constituted of a plywood box.

7. A heat insulation structure for corner parts of an LNG storage tank, the LNG storage tank including a secondary insulation wall comprising multiple secondary insulation panels arranged on an inner wall of a hull, a secondary sealing wall disposed on the secondary insulation wall, a primary insulation wall comprising multiple primary insulation panels arranged on the secondary sealing wall, and a primary sealing wall disposed on the primary insulation wall, the heat insulation structure comprising:

endcap sheets each comprising an endcap corrugation formed on a flat metal sheet and sealing a corrugation formed on the primary sealing wall, wherein each of the endcap sheets comprises an elongated corrugation extending in a direction perpendicular to the endcap corrugation such that the elongated corrugations formed on the endcap sheets are continuously connected to each other and extend in longitudinal and transverse directions of the storage tank, as the endcap sheets are continuously arranged in the longitudinal and transverse directions of the storage tank.

8. The heat insulation structure according to claim 7, wherein the primary sealing walls disposed on adjacent surfaces of the storage tank respectively comprise edges that are apart from each other.

9. The heat insulation structure according to claim 8, further comprising:

a corner finishing sheet finishing an endcap sheet disposed at a distal end of the storage tank among the endcap sheets continuously arranged in the longitudinal and transverse directions of the storage tank, and the corner finishing sheet comprising a corner finishing corrugation finishing the elongated corrugation formed on the endcap sheet.

* * * * *